United States Patent [19]

Fuhr et al.

[11] Patent Number: 4,528,307

[45] Date of Patent: Jul. 9, 1985

[54] RADIATION HARDENABLE PRIMER

[75] Inventors: Karl Fuhr; Hans-Joachim Freier, both of Krefeld, Fed. Rep. of Germany

[73] Assignee: Bayer Aktiengesellschaft, Leverkusen, Fed. Rep. of Germany

[21] Appl. No.: 532,282

[22] Filed: Sep. 15, 1983

[30] Foreign Application Priority Data

Sep. 25, 1982 [DE] Fed. Rep. of Germany ....... 3235610

[51] Int. Cl.$^3$ ..................... C09D 3/80; C03C 25/02; C04B 41/22; C08K 7/02
[52] U.S. Cl. ................... 523/440; 204/159.15; 204/159.19; 428/511; 523/443; 523/513; 523/517; 523/527; 524/413; 524/471; 524/472; 524/473; 524/494; 524/847; 524/850; 524/854; 524/857; 525/112; 525/126; 525/175; 525/423; 525/424; 525/425; 525/426; 525/438; 525/440; 525/445
[58] Field of Search ............. 525/176, 175, 278, 286, 525/539, 112, 126, 423–426, 444, 445, 438, 440; 204/159.19, 159.15; 524/471, 472, 473, 850, 847, 413, 494, 854; 523/440, 443, 439, 513, 523, 527

[56] References Cited

U.S. PATENT DOCUMENTS

| | | | |
|---|---|---|---|
| 3,649,338 | 3/1972 | Ishida | 524/847 |
| 4,081,492 | 3/1978 | Traenckner et al. | 204/159.15 |
| 4,180,474 | 12/1979 | Schuster et al. | 204/159.14 |
| 4,198,199 | 4/1980 | Dow et al. | 427/55 |
| 4,205,018 | 5/1980 | Nagasawa et al. | 525/405 |
| 4,225,695 | 9/1980 | Schuster et al. | 204/159.19 |
| 4,232,058 | 11/1980 | Dow et al. | 427/54.1 |
| 4,260,703 | 4/1981 | Hodakowski et al. | 525/404 |
| 4,309,334 | 1/1982 | Valitsky | 521/55 |
| 4,324,575 | 4/1982 | Levy | 427/54.1 |
| 4,401,688 | 8/1983 | Garnett | 427/54.1 |
| 4,439,600 | 3/1984 | Moran | 525/455 |

Primary Examiner—Herbert J. Lilling
Attorney, Agent, or Firm—Connolly and Hutz

[57] ABSTRACT

This invention relates to radiation hardenable primers based on prepolymers containing (meth) acryloyl groups and conventional auxiliary agents. The primers are characterized in that they contain organic and/or inorganic fibres having a fibre length distribution curve reaching its maximum in the region of from 50 to 600 μm. These primers are suitable for coating articles which have absorbent surfaces, in particular for the continuous coating of wood-concrete articles such as wood-concrete boards.

7 Claims, No Drawings

RADIATION HARDENABLE PRIMER

This invention relates to radiation hardenable primers based on prepolymers containing (meth)acryloyl groups and conventional auxiliary agents. The primers are characterised in that they contain organic and/or inorganic fibres having a fibre length distribution curve reaching its maximum in the region of 50 to 600 μm. These primers are suitable for coating articles which have absorbent surfaces, in particular for the continuous coating of wood-concrete articles such as wood-concrete boards.

It is known to use prepolymers containing (meth)acryloyl groups in combination with reactive diluents such as mono-, di- and tri-(meth)acrylates of mono- to trihydric alcohols, a ketone resin, a photoinitiator, a sensitizing agent and optionally pigments, fillers and other auxiliaries as photopolymerizable coatings for building materials such as asbestos cement-calcium silicate boards, asbestos slate boards, clay or earthenware plates and mortar cement, etc. The coatings obtained after hardening are said to be resistant to solvents and water and have an attractive appearance and dirt-repellent properties. These advantageous characteristics are said to be due to the presence of the ketone resin (see German PS No. 2,937,266=U.S. Pat. No. 4,295,947).

It is also known to harden prepolymers containing (meth)acryloyl groups, optionally in admixture with copolymerizable monomers, by ionizing radiation, e.g. electron radiation (see U.S. Pat. No. 3,770,602; DE-AS No. 2 003 820=GB-PS No. 1 286 591; DE-AS No. 2 339 509=U.S. Pat. No. 3,971,711; DE-AS No. 2 343 085=U.S. Pat. No. 4,094,925; DE-OS 2 249 446=U.S. Pat. No. 3,948,739; DE-OS No. 2 815 721=U.S. Pat. No. 4,108,840).

Wood-concrete manufactured from mineralized organic aggregates (e.g. wood chips treated with milk of lime), cement and water for binding is another known building material. Wood concrete has a density of about 0.4 to 1.5 g/cm³ and has a high thermal insulating capacity, exceptional water resistance and high elasticity of compression and can easily be worked mechanically by sawing, drilling, nailing, filing, cutting, milling and the like and is fire resistant (see Ullmanns Enzyklopädie der technischen Chemie, 3rd Edition (1953), Volume 4, pages 232–233, publishers Urban and Schwarzenberg, Munich-Berlin). Wood-concrete articles such as boards, panels, blocks, rods and pipes, in particular planar, curved or corrugated boards (thickness: preferably 0.3 to 10 cm, width: preferably up to 1.50 m and length: preferably up to 3 m) are used as ready made parts for interior and external construction work.

Wood-concrete articles have a relatively coarse, rough, absorbent surface regardless of whether they have been sanded down or not, and all the more so the lower their density. These wood-concrete articles are coated both for the purpose of increasing their possible range of practical application and serviceability and in order to improve their appearance.

It is known to the person of the art to use prepolymers containing (meth)acryloyl groups in combination with conventional auxiliary agents for coating wood-concrete boards and to harden the coatings by means of electron radiation. For reasons of economy, the coatings are preferably applied on continuously operating lacquering apparatus (roller lacquering or casting macchines). Owing to the coarse, rough, absorbent surface of wood-concrete boards, it is generally necessary to apply at least two successive coats of primer and harden virtually each layer of primer and then smooth the hardened primers in order to eliminate the absorbency of the boards as far as possible and fill up any holes and cracks in the surface. A structured top coat is subsequently applied preferably continuously, and hardened.

It is an object of the present invention to keep the number of undercoats low and indeed, if possible, to apply only one undercoat and one top coat, and yet obtain a perfect lacquer finish. Moreover, it should be possible to apply the undercoat and top coat by means of continuously operating lacquering apparatus.

This problem was solved by using, for the preparation of the undercoat or of at least one of the undercoats, a primer containing organic and/or inorganic fibres having a fibre length distribution curve with its maximum in the region of from 50 to 600 μm.

The present invention thus provides a radiation hardenable primer of prepolymers containing (meth)acryloyl groups and conventional auxiliary agents, characterised in that the primer contains organic and/or inorganic fibres having a fibre length distribution curve which has its maximum in the region of from 50 to 600 μm.

The invention also provides wood concrete articles coated with a radiation hardened coating of at least one undercoat and at least one top coat, characterised in that for the formation of the undercoat or undercoats, there is used at least one primer containing organic and/or inorganic fibres having a fibre length distribution curve reaching its maximum in the region of from 50 to 600 μm.

The wood-concrete articles preferably have a density of from 1.0 to 1.5 g/cm³.

The prepolymers with (meth)acryloyl groups contained in the radiation hardenable primers according to the invention contain at least two (meth)acryloyl groups, preferably 2 to 4 acryloyl groups, and are derived from polyesters, polyethers, polyepoxide compounds, aliphatic polyols, polyurethanes and vinyl polymers. (Meth)acrylate prepolymers of this type are known and have been described, for example, in U.S. Pat. Nos. 2,101,107; 2,413,973; 2,951,758; 3,066,112; 3,301,743; 3,368,900; 3,380,831; 3,455,801; 3,469,982; 3,485,732; 3,530,100; 3,551,246; 3,552,986; 3,628,963; 3,660,145; 3,664,861; 3,689,610; 3,719,521; 3,732,107; 3,782,961; 3,840,369; 3,888,830; 4,033,920; 4,081,492; 4,206,025; GB-PS Nos. 1 006 587; 1 241 823; 1 241 824; 1 321 372; DE-OS Nos. 1 916 499 and 2 853 921.

The following are preferred (meth)acrylate prepolymers: Polyester (meth)acrylates, polyepoxy (meth)acrylates and polyurethane (meth)acrylates.

The conventional auxiliary agents contained in the primers according to the invention include reactive, radiation-hardenable monomers and mixtures of such monomers. These monomers serve as diluents for the prepolymer and/or they serve to vary the mechanical properties, e.g. the hardness, of the hardened primer layer. Examples of such reactive, radiation-hardenable monomers include acrylic and methacrylic acid esters, preferably of monohydric to trihydric aliphatic alcohols or of alkoxylation products thereof, in particular ethoxylation products. In the case of alkoxylation products, an average of from 0.8 to 4 mol of an alkylene oxide such as ethylene oxide or propylene oxide, preferably ethylene oxide, has been chemically added for each hydroxyl group of the monohydric or higher hydric alcohol.

Reactive, radiation-hardenable monomers which are particularly preferred are the acrylates of dihydric and trihydric alcohols and their ethoxylation products.

The following are specific examples: Ethylene glycol di(meth)acrylate, di(meth)acrylates of diethyleneglycol, triethyleneglycol, tetraethyleneglycol and pentaethylene glycol; propylene glycol di(meth)acrylate; di(meth)acrylates of di- to penta-propylene glycols; neopentyl di(meth)acrylate; butane-1,4-diol di(meth)acrylate; hexane-1,6-diol di(meth)acrylate; trimethylolpropane tri(meth)acrylate, and triacrylates of ethoxylated trimethylolpropane having a degree of ethoxylation of from 2.5 to 4 according to DE-PS 2 651 507.

The primer preferably contains, as radiation-hardenable components, from 20 to 80% by weight of prepolymers containing (meth)acryloyl groups and from 80 to 20% by weight of reactive, radiation-hardenable monomers.

The primer may contain, as auxiliary substances, from 0.001 to 0.1% by weight, based on the radiation-hardenable components, of conventional polymerisation inhibitors or antioxidants. The following are examples of such compounds:

4,4'-Bis-(2,6-di-tert.-butylphenol);
1,3,5-trimethyl-2,4,6-tris-(3,5-di-tert.-butyl-4-hydroxybenzyl)-benzene;
4,4'-butylidene-bis-(6-tert.-butyl-m-cresol);
3,5-di-tert.-butyl-4-hydroxybenzyl-phosphonic acid diethyl ester;
N,N'-bis($\beta$-naphthyl)-p-phenylenediamine;
N,N'-bis-(1-methylheptyl)-p-phenylenediamine;
phenyl-$\beta$-naphthylamine;
4,4'-bis-($\alpha,\alpha$-dimethylbenzyl)-diphenylamine;
1,3,5-tris-(3,5-di-tert.-butyl-4-hydroxy-hydrocinnamoyl)hexahydro-s-triazine;
hydroquinone; p-benzoquinon; hydroquinone monomethylether;
2,5-di-tert.-butylquinone; toluhydroquinone;
p-tert.-butyl-pyrocatechol;
3-methyl-pyrocatechol; 4-ethyl-pyrocatechol;
chloranil; naphthoquinone; copper naphthenate;
copper octoate; Cu(I)Cl/triphenylphosphite,
Cu(I)Cl/trimethylphosphite;
Cu(I)Cl/trichloroethylphosphite;
Cu(I)Cl/tripropylphosphite; and
p-nitrosodimethylaniline.

The primer may also contain, as auxiliary substances, from 0.1 to 5% by weight, based on the radiation hardenable component, of antisettling agents, for example, dimethylstearylamine, distearylamine, stearic acid, metal stearates of mono-to trivalent metals, stearyl alcohol, the corresponding oleyl derivatives, disperse or highly disperse silicas, or chemically modified montmorillonites, or also very finely divided fillers (grain size <20 $\mu$m) such as heavy spar, chalk, gypsum, talcum and kaolin, used in quantities of from 5 to 50%, based on the radiation-hardenable components.

If the primer according to the invention is applied to the surface of the article as the only or the second undercoat, it may also contain from 15 to 40% by weight, based on the radiation hardenable components, of white and/or coloured pigments. The following are examples: Titanium dioxide, iron oxides, chromium oxide, antimony oxide, mixed oxides of cobalt/nickel and manganese, chromates such as lead or strontium chromate, red lead oxide, phthalocyanine pigments, and aluminium and copper bronzes. The pigments may also be blended in known manner with fillers such as silica, talcum, heavy spar, chalk, gypsum, powdered asbestos or light spar.

The primer according to the invention in all cases contains inorganic and/or organic fibres having a fibre length distribution curve which has its only maximum in the region of from 50 to 600 $\mu$m, preferably from 50 to 200 $\mu$m. The fibre content amounts to 10 to 30% by weight, based on the radiation hardenable components. The following are examples of fibres: Glass fibres, asbestos fibres, carbon fibres and polyester, polyamide and polyacrylonitrile fibres. Glass fibres are preferred. The diameter of the fibres is preferably below 25 $\mu$m in particular from 10 to 20 $\mu$m.

The coating compound used for the top coat preferably contains, as binder, the same radiation-hardenable components as those indicated for the primer, and in the same percentage proportions. It does not contain any organic and/or inorganic fibres, but it must contain the pigments which may also be used in the single or second undercoat, and in quantities of from 25 to 100% by weight, based on the radiation-hardenable components. The other auxiliary agents mentioned for the primer, such as polymerisation inhibitors or anti-oxidants and antisettling agents, may be present in the same quantitative proportions in the top coating compound. In addition, this coating compound may contain matting agents (e.g. disperse silica), levelling agents (e.g. cellulose esters, oligoacrylates, silicone oils), soluble dyes, UV absorbents (e.g. benzothiazole derivatives according to U.S. Pat. No. 3,189,615 or benzophenone according to U.S. Pat. Nos. 3,043,709, 3,049,443, 2,693,492, 2,853,521 and 2,777,828) and quenchers and radical acceptors (e.g. sterically hindered amines according to DE-OS Nos. 2 417 535 and 2 456 864) in the usual quantities.

It may sometimes be advantageous also to use other additives, either in order to improve the film-forming properties of the resin masses or to obtain layers with exceptionally scratch-resistant surfaces. Other types of resins, such as saturated or unsaturated polyesters, for example, may conventionally be added for such a purpose.

The resins are preferably used in quantities of from 1 to 50% by weight, based on the polymerisable components, but only those resins should be used, and only in such limited quantities, that the reactivity is not impaired. Suitable lacquer resins conventionally used in the lacquer industry are mentioned in the Tables of lacquer raw materials drawn up by E. Karsten, 5th Edition, publishers Curt R. Vincentz, Hanover, 1972, pages 74–106, 195–258, 267–293, 335–347 and 357–366.

Application of the undercoat or top coat may be carried out discontinuously but is preferably carried out by means of continuously operating roller lacquering or casting machines. The thickness of the individual wet undercoat is from 25 to 150 $\mu$m and that of the wet top coat is from 10 to 100 $\mu$m.

When coating wood-concrete articles having a density >1.2 g/cm$^3$, it is sufficient to use one undercoat, optionally containing pigments and fillers, and one top coat. For a wood concrete article having a density <1.2 g/cm$^3$, the first undercoat is preferably followed by a second, coloured undercoat, optionally containing pigment, before the top coat lacquer is applied.

Hardening is advantageously carried out by means of ionizing radiation in an inert gas, such as nitrogen, preferably using electron beams. Hardening may be carried out using a radiation dose from about 0.01 to about 20 Megarad (Mrad). It is preferable for economical reasons to use continuously operating coating apparatus with sources of radiation having an accelerator voltage of from 100 to 500 kiloVolt (kV) and current intensities of from 5 to 80 milli-Amps (mA). The distance of the source of electron beams from the layer to be hardened is usually from 10 to 20 cm. The radiation dose obtainable with such apparatus is in the region of from 1 to 50 Mrad. After application of the undercoat and partial hardening (i.e. the layer is dust-dry and ready to be smoothed) and smoothing of the undercoat, the top coat may be applied and the coating hardened. When two undercoats are applied, the second undercoat, optionally coloured with soluble dyes and/or pigments, may be applied while the first undercoat is still wet and it may then be partially hardened, smoothed, covered with top coat and finally hardened.

As will be seen from the Examples and Comparison Examples in the experimental part of this application, the primers according to the invention provide a simplified and economical process of lacquering which give rise to reproducible coatings with consistent properties which provide substantial protection to the wooden articles against damage by scraping, rubbing or impact during transport, assembly and use and impart to them an attractive appearance. It was surprising to find that when the fibres in the primer were replaced by an equal quantity of a conventional filler but the procedure was otherwise the same, the undercoats could not prevent partial penetration of the top coat lacquer into the body of the article, with the result that coatings with craters and gross unevenness of the surface were obtained.

The parts and percentages given in the following, experimental part are parts and percentages by weight.

EXPERIMENTAL PART

Urethane acrylate prepolymer A according to European Pat. No. 0 000 890=U.S. Pat. No. 4,225,695

29.99 Parts of isophorone diisocyanate are introduced into a reaction vessel and 2.15 parts of thiodiglycol are added with stirring and cooling during the course of 2 hours, when the temperature should not exceed 60° C. After the addition of 0.09 part of tin-(II)-2-ethylhexoate and 0.01 part of di-tert.-butyl-hydroquinone, 12.55 parts of 2-hydroxyethylacrylate are added while air is passed through the apparatus, and the temperature should not exceed 65° C. at this stage. When an isocyanate content of about 14% has been reached, after about 4 hours, 30.24 parts of ethoxylated trimethylolpropane (TMP) obtained from 1 mole of TMP and 12 mole of ethylene oxide are added, with the temperature not exceeding 60° C. Stirring is then continued at 60° C. while dry air is passed over the reaction mixture until the isocyanate content has fallen below 0.1%. A colourless, odourless resin is obtained (urethane acrylate prepolymer A), which is dissolved in 24.97 parts of hexane-1,6-diol diacrylate.

Epoxyacrylate prepolymer B according to DE-PS No. 2 534 012=U.S. Pat. No. 4,081,492

55.63 Parts of bisphenol-A-bis-glycidyl ether (epoxide equivalent 190) are heated to 60° C. in a 10 l three-necked flask equipped with stirrer, dropping funnel and reflux condenser. 0.89 Part of monoethanolamine is added at this temperature during a period of 3 hours. 0.69 Part of thiodiglycol (catalyst) is then added, followed by the addition of 13.23 parts of acrylic acid within 2 hours at 60° C., which in turn is followed by the addition of 4.5 parts of acetic acid within 30 minutes. Stirring is continued at 60° C. until acid number 0 (N/10 NaOH/bromothymol blue) is reached, and the reaction mixture is then stabilized with 0.04 part of p-methoxyphenol and 0.02 part of toluhydroquinone. The reaction mixture is then stirred with 25 parts of ethoxylated trimethylol propane triacrylate (C) and cooled to room temperature.

The epoxyacrylate prepolymer obtained is dissolved to form a 75% solution in ethoxylated trimethylolpropane triacrylate (C).

Ethoxylated trimethylolpropane triacrylate C has a degree of ethoxylation of 3.75 and is obtained according to DE-PS 2 651 507=U.S. Pat. No. 4,180,474, Methods A and B. The degree of ethoxylation indicates the number of mols of ethylene oxide per mol of trimethylolpropane.

Polyester acrylate prepolymer D a. Partially acryloylated ethoxylated trimethylol propane A partial ester containing acryloyl groups and OH groups is prepared by azeotropic esterification of an ethoxylated trimethylolpropane (OH number 550 (mg of KOH/g of substance), degree of ethoxylation about 3.75) with acrylic acid.

430 Parts of acrylic acid, 12 parts of p-toluene sulphonic acid, 1 part of p-methoxyphenol, 1.2 parts of di-tert.-butyl hydroquinone and 280 parts of toluene are added to 925 parts of ethoxylated trimethylolpropane, and the water of reaction is removed azeotropically. When the acid number has fallen below 3 (mg of KOH/g of substance), the solvent is removed under vacuum and the product is clarified by filtration. A partial ester of ethoxylated trimethylolpropane containing OH groups and acryloyl groups is obtained. The partial ester has an average OH number (mg of KOH/g of substance) of 105 and an average acid number (mg of KOH/g of substance) of 2 and contains, on average, one hydroxyl and two acryloyl groups per mol.

b. Polyester

A polyester with acid number 328 mg of KOH/g of substance is prepared from adipic acid and butane-1,4-diol in a molar ratio of 2:1 by solvent-free condensation.

c. Polyester acrylate prepolymer D

668 Parts of the partially acryloylated trimethylolpropane prepared under (a) and 346 parts of the acid polyester prepared under (b) are azeotropically esterified in the presence of 10 parts of p-toluenesulphonic acid, 0.4 parts of p-methoxyphenol and 0.4 part of di-tert.-butylhydroquinone, using 300 parts of toluene as a vehicle, until no more water separates. The vehicle is distilled off under vacuum. The polyester acrylate prepolymer D obtained has an acid number of 5.2 and contains on average four acryloyl groups per mol. It is dissolved to form a 75% solution in hexane-1,6-diol diacrylate.

EXAMPLES

EXAMPLE 1

A primer having the following composition is applied to a wood-concrete board (density 1.24 g/cm³) in a quantity of 80 g/m², using a roller lacquering machine:

|  | Parts |
| --- | --- |
| Urethane acrylate prepolymer A | 100.0 |

-continued

|  | Parts |
|---|---|
| 75% in hexane-1,6-diol diacrylate Ethoxylated trimethylolpropane triacrylate C | 100.0 |
| Hexane-1,6-diol diacrylate | 20.0 |
| Unsized glass fibres, distribution curve of the fibre lengths having its maximum in the region of 50–200 μm, glass fibre diameter about 14 μm | 50.0 |

The viscosity of composition is 2.0 Pa.s at 20° C.

The primer is partially hardened by means of electron beams in an inert gas (nitrogen). The accelerator voltage is 320 kV, the cathode current 10 mA at an operating width of 120 cm, and the transport velocity of the board is 25 m/min. The distance of the layer applied from the source of electron radiation is 15 cm.

The surface is then rubbed smooth before a top coat lacquer having the following composition is applied in a quantity of 80 g/m² , using a roller casting machine:

|  | Parts |
|---|---|
| Urethane acrylate prepolymer A 75% in hexane-1,6-diol diacrylate | 100.0 |
| Hexane-1,6-diol diacrylate | 200.0 |
| Titanium dioxide (rutile type) | 150.0 |
| Disperse silica (matting agent) | 60.0 |

The viscosity of the top coat lacquer is 2.0 Pa.s at 20° C.

Both layers are hardened by means of electron beams in an inert gas. The accelerator voltage is 320 kV, the cathode current 50 mA at an operating width of 120 cm and the transport velocity is 25 m/min. The distance from the source of electron radiation is 15 cm.

The priming to a large extent smooths out the irregularities of the surface of the board and overcomes the absorbency originally present so that the top lacquer coat is substantially even and at no point pulled into the surface. No formation of craters can be observed in the top layer.

COMPARISON EXPERIMENT 1

Example 1 is repeated exactly except that the primer does not contain any glass fibres and the 20 parts of hexane-1,6-diol diacrylate are omitted since a viscosity of 2.0 Pa.s (20° C.) is obtained without this addition.

After hardening, the formation of craters is observed in many places where the top coat lacquer has passed through the primer to penetrate the surface of the wood-concrete board. The layer of primer is incapable of eliminating the absorbency of the wood-concrete surface.

COMPARISON EXPERIMENT 2

Example 1 is repeated exactly except that the primer contains 50 parts of unsized glass fibres having an average fibre length of 1000 μm (fibre diameter about 14 μm). At this fibre length, continuous and uniform application of the primer by means of a roller lacquering machine is impossible. At the dosing gap between the applicator roller and the dosing roller and at the applicator gap between the applicator roller and the surface of wood-concrete board to be coated, the glass fibres partly accumulate and agglomerate and become felted. Where these felted agglomerates reach the surface of the board, coating is not achieved uniformly and the primer coat obtained after hardening it uneven with projecting bundles of felted glass fibres so that a perfect coating cannot be obtained even after rubbing down and application of the lacquer top coat.

The same result is obtained when the primer layer is applied by means of a continuously operating casting apparatus.

COMPARISON EXPERIMENT 3

Example 1 is repeated exactly except that the 50 parts of glass fibres are replaced by 50 parts of barium sulphate having an average particle size of 10 μm (approximately corresponding to the glass fibre diameter of about 14 μm). Application of the primer layer does not provide any problems but this layer only incompletely removes the absorbency of the surface of the wood-concrete board. The top coat lacquer partly passes through the primer layer to penetrate the surface of the board, and an unusable coating full of craters is obtained.

EXAMPLE 2

Example 1 is repeated exactly except that 100 parts of epoxyacrylate prepolymer B at a concentration of 75% in ethoxylated trimethylolpropane triacrylate C is used instead of 100 parts of urethane acrylate prepolymer A at a concentration of 75% in hexane-1,6-diol diacrylate.

The hardened coating obtained is flawless and no craters can be observed in the top coat.

EXAMPLE 3

Example 1 is repeated exactly except that the unsized glass fibres are replaced by glass fibres of the same length and diameter which have been sized with a commercial polysiloxane size.

A flawless coating similar to that of Example 1 is obtained.

EXAMPLE 4

Example 1 is repeated exactly except that the glass fibres are replaced by glass fibres having a fibre length distribution curve with its maximum in the region of from 200 to 600 μm (fibre diameter about 14 μm).

A flawless coating, similar to that of Example 1, is obtained.

EXAMPLE 5

A wood-cement board is primed as described in Example 1. 80 g/m² of a second, coloured undercoat containing pigment and having the composition indicated below is applied by means of a roller casting machine while the first, transparent layer is still wet:

|  | Parts |
|---|---|
| Urethane acrylate prepolymer A 75% in hexane-1,6-diol diacrylate | 100.0 |
| Ethoxylated trimethylolpropane triacrylate C | 50.0 |
| Hexane-1,6-diol diacrylate | 55.0 |
| Titanium dioxide (rutile type) | 150.0 |

The viscosity of the coloured undercoat is 2.0 Pa.s at 20° C.

The two coats are partially hardened and rubbed down together as described in Example 1.

A top coat lacquer having the composition indicated below is then applied in a quantity of 50 g/m² by means of a roller lacquering machine having a foam rubber applicator roller:

|  | Parts |
|---|---|
| Urethane acrylate prepolymer A, 75% in hexane-1,6-diol diacrylate | 100.0 |
| Hexane-1,6-diol diacrylate | 160.0 |
| Titanium dioxide (rutile type) | 150.0 |
| Disperse silica | 60.0 |

The viscosity is 4.0 Pa.s at 20° C.

The layers are hardened together in an inert gas, using electron beams with an accelerator voltage of 320 kV, a cathode current of 50 mA, an operating width of 120 cm and a transport velocity of 25 m/min. The distance from the source of electron beams is 15 cm.

The primer and top coat together give produce a perfect coating. A textured surface is obtained by using a foam rubber roller. The surface satisfies the requirements in all respects. All irregularitires of the surface of the board are covered. No formation of craters is observed.

EXAMPLE 6

The wood-concrete board coated in this Example has a density of 1.15 g/cm$^3$ and is more absorbent than those used in the preceding Examples and Comparison Examples. This board therefore requires the application of two priming undercoats with a glass fibre content whereas the coloured undercoat used in Example 5 need not contain glass fibres.

The first priming is carried out as described in Example 1.

A coloured primer having the following composition is then applied in a quantity of 80 g/m$^2$ to the wet, transparent primer coat, using a roller casting machine:

|  | Parts |
|---|---|
| Urethane acrylate prepolymer A, 75% in hexane-1,6-diol diacrylate | 100.0 |
| Ethoxylated trimethylolpropane triacrylate C | 50.0 |
| Hexane-1,6-diol diacrylate | 60.0 |
| Titanium dioxide, rutile type | 150.0 |
| Glass fibres having a fibre length distribution curve with its maximum in the region of from 50–200 μm | 50.0 |

The viscosity of the coloured primer is 2.0 pa.s at 20° C.

The priming undercoats are partly hardened and smoothed together, as described in Example 1.

Application of the top coat lacquer and hardening of all the layers together are carried out as described in Example 5.

The finished, hardened lacquer coat has a flawless appearance. A perfect coating is obtained in spite of the increased absorbency of wood-concrete boards which have a specific gravity below 1.2 g/cm$^3$. All surface irregularities of this board are completely covered. No crater formation is seen in the coating.

COMPARISON EXPERIMENT 4

Example 6 is repeated exactly except that the glass fibres are omitted from the coloured primer and the quantity of hexane-1,6-diol diacrylate is reduced to 30 parts so that a viscosity of 2.0 Pa.s at 20° C. is again obtained.

The hardened coating has craters due to the fact that the top coat lacquer has in many places passed through the primer to penetrate the surface of the board.

The general observation is made that wood-concrete boards having a density below 1.2 g/cm$^3$ require the application of two undercoats containing glass fibres in order to fill up all the irregularities, pits and cracks in the board and enable a perfect coating to be obtained.

EXAMPLE 7

Example 6 is repeated but the following alterations:
1. In the first undercoat, the urethane acrylate prepolymer in the hexane-1,6-diol diacrylate is replaced by an equal quantity of epoxyacrylate prepolymer B at a concentration of 75% in ethoxylated trimethylol propane triacrylate C.
2. In the coloured undercoat, the urethane acrylate prepolymer is replaced by an equal quantity of polyester acrylate C at a concentration of 75% in hexane-1,6-diol diacrylate.

The hardened coating has a flawless appearance. No crater formation can be observed.

EXAMPLE 8

80 g/m$^2$ of the coloured undercoat from Example 6 are applied to a wood-concrete board (density 1.24 g/cm$^3$), using a roller lacquering machine.

This undercoat is partly hardened and rubbed smooth as described in Example 1. Application of the top coat lacquer and hardening of both layers together are carried out as described in Example 5. The finished, hardened lacquer has a flawless appearance.

For wood-concrete boards having a specific gravity above 1.2 g/cm$^3$, one priming undercoat is sufficient (see Example 1). Since the top coat lacquer applied as a textured coat in a quantity of 50 g/m$^2$ does not have sufficient covering power in such thin layers, the undercoat must be pigmented.

COMPARISON EXAMPLE 5

Example 8 is repeated exactly except that the coloured undercoat of Example 6 does not contain any glass fibres. The quantity of hexane-1,6-diol diacrylate is reduced to 55 parts to obtain the same viscosity (see undercoating in Example 5). The layer of undercoat is now unable to prevent the absorbency of the wood-concrete surface. Crater formation is observed in many places after application and hardening of the top coat lacquer.

We claim:

1. A radiation-hardenable primer comprising at least one prepolymer containing acryloyl groups, methacryloyl groups or both, and organic or inorganic fibers having a fiber length distribution curve with its maximum in the region of 50 to 600 μm.

2. A radiation-hardenable primer according to claim 1 wherein the at least one prepolymer is a polyester acrylate, a polyester methacrylate, a polyepoxy acrylate, a polyepoxy methacrylate, a polyurethane acrylate or a polyurethane methacrylate.

3. A radiation-hardenable primer according to claim 1, which contains from 20 to 80% by weight of at least one prepolymer containing acryloyl, methacryloyl groups or both and from 80 to 20% by weight of reactive radiation-hardenable monomers.

4. A radiation-hardenable primer according to claim 1, which contains from 10 to 30% by weight, based on the radiation hardenable constituents, of organic or inorganic fibres.

5. A radiation-hardenable primer according to claim 1, wherein the fibres are glass fibres.

6. A radiation-hardenable primer comprising at least one prepolymer comprising a polyurethane acrylate or polyurethane methacrylate and organic or inorganic fibers having a fiber length distribution curve with its maximum in the region of 50 to 600 μm.

7. A radiation-hardenable primer according to claim 6 wherein the prepolymer is a polyurethane acrylate which is the reaction product of isophorone diisocyanate, thiodiglycol, 2-hydroxyethylacrylate and ethoxylated trimethylol-propane.

* * * * *